US006670603B2

(12) United States Patent
Shimada et al.

(10) Patent No.: US 6,670,603 B2
(45) Date of Patent: Dec. 30, 2003

(54) IMAGE PROJECTOR AND IMAGE CORRECTION METHOD

(75) Inventors: Yasuhiro Shimada, Kanagawa (JP); Atsushi Kandori, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/190,685

(22) Filed: Jul. 9, 2002

(65) Prior Publication Data

US 2003/0010888 A1 Jan. 16, 2003

(30) Foreign Application Priority Data

Jul. 11, 2001 (JP) ........................................ 2001-211040

(51) Int. Cl.[7] .................................................. H01J 3/14
(52) U.S. Cl. .......................... 250/235; 353/69; 348/744
(58) Field of Search ............................. 250/201.1, 216, 250/234–236, 204, 205; 359/216–221, 197; 353/30, 31, 37, 69, 70, 99; 352/105, 111, 112; 348/744, 756, 759

(56) References Cited

U.S. PATENT DOCUMENTS

| 4,457,580 A | * | 7/1984 | Klose ........................ 359/221 |
| 5,489,950 A | * | 2/1996 | Masuda ...................... 359/196 |
| 5,606,447 A | * | 2/1997 | Asada et al. ................. 359/199 |
| 5,627,649 A | * | 5/1997 | Sawayama et al. ......... 250/235 |
| 5,800,032 A | * | 9/1998 | Uchiyama et al. ........... 353/69 |
| 6,104,519 A | * | 8/2000 | Shiraishi et al. ............ 359/204 |
| 6,449,036 B1 | * | 9/2002 | Wollmann et al. .......... 359/211 |

FOREIGN PATENT DOCUMENTS

JP          2722314          11/1997

* cited by examiner

*Primary Examiner*—Stephone B. Allen
(74) *Attorney, Agent, or Firm*—Fitzpatrick, Cella, Harper & Scinto

(57) ABSTRACT

An image projector of the present invention which is capable of automatically adjusting a size of an image area and a focal distance has light sources with a device for modulating light for forming an image, a measuring light source for supplying measuring light, a mixing optical system for mixing the light for forming an image and the measuring light on one optical axis, a projection device for scanning the light mixed by the mixing optical system and projecting the mixed light onto a screen, a photodetector for detecting the measuring light reflected by the screen, and correction devices for correcting an image by controlling the projected light on the basis of a result of detection by the photodetector.

21 Claims, 8 Drawing Sheets

IMAGE PROJECTOR AND IMAGE CORRECTION METHOD

BACKGROUND OF THE INVENTION

1. Field of the Invention

The present invention relates to an image projector which is small in size and has improved portability, and an image correction method.

2. Related Background Art

Laser displays have been proposed which directly scan a projection screen with a laser light beam by using projection means such as an optical deflector, e.g., a polygon mirror or a galvanometer mirror to display a television image or the like. This type of display device is incapable of direct modulation in the case of high-resolution display because the light source used therein is a gas laser. There is a need to perform modulation of light output from the laser light source by using a high-priced electro-optic or acousto-optic modulator. Also, the scale of the display device is large and a screen must be set in a fixed position.

Laser displays have recently been proposed in which a semiconductor light emitting device such as a laser diode or a light emitting diode (LED) capable of direct modulation is used as a light source, and in which a micromirror is used as an optical deflector. FIG. 1 shows a configuration of a laser display apparatus using a semiconductor light emitting device. The laser display shown in FIG. 1 is constituted by a light source modulation drive unit 100, a direct-modulation light source 101, a first optical deflector 102, a second optical deflector 103, an emergent-beam-correction optical system 104, and a projection surface 105. The display apparatus thus arranged can be reduced in size and in cost because there is no need to use an optical modulator.

As an example of the micromirror used in this arrangement, an ultraminiature optical deflector having a square mirror about several millimeters per side will be described which has been realized by a technique for working a semiconductor material, i.e., silicon, which is called micromechanics (Japanese Patent No. 02722314). FIG. 2 shows a micromirror made by using the micromechanical technique. The micromirror shown in FIG. 2 is constituted by a silicon substrate 200, a movable plate 201, torsion bars 202, a planar coil 203, a mirror 204, an electrode terminal 205, and permanent magnets 206. This micromirror is of an electromagnetic type such that a drive current is caused to flow through the planar coil 203 and the Lorenz force between the planar coil 203 and the permanent magnets 206 is utilized as a drive force. A number of electrostatic or piezoelectric micromirrors have also been proposed. It is possible to realize a laser display reduced in size and in power consumption by the semiconductor light emitting device and the micromirror described above.

It is conceivable that an image projector smaller in size and having improved portability, e.g., one of the above-described image projectors, unlike stationary types, is used to project light in any of various forms onto an object which reflects light (hereinafter referred to as "screen"). A situation is also conceivable in which the image projector performs while the positional relationship between the screen and the image projector is being changed. In such a situation, there is a need to adjust a projected image according to the positional relationship between the screen and the image projector. More specifically, there is a need to adjust the size of the image area and the focal distance according to the distance between the screen and the image projector. There is also a need to correct the shape of the image area according to an inclination or a curvature of the screen. However, it is difficult to perform such automatic correction in the above-described image projector.

SUMMARY OF THE INVENTION

In view of the above-described circumstances, an object of the present invention is to provide an image projector:

(1) having a function of automatically adjusting a size of an image area and a focal distance corresponding to a distance between a screen and a image projector, and (2) having a function of automatically correcting a shape of the image area corrresponding to an inclination or a curvature of the screen, and (3) simpler in structure, reduced in size and in weight, and having improved portability, and a method for correction in the image projector.

To attain the above-described object, according to one aspect of the present invention, there is provided an image projector comprising: a light source having means for modulating light for forming an image, a measuring light source for supplying measuring light, a mixing optical system for mixing the light for forming an image and the measuring light on one optical axis, an optical deflector for scanning the light mixed by the mixing optical system and projecting the light onto a screen, a photodetector for detecting the measuring light reflected on the screen, and correction means for correcting an image by controlling the projected light on the basis of the result of detection performed by the photodetector.

According to another aspect of the present invention, there is provided an image projector comprising: a light source having means for modulating light for forming an image, an optical deflector for scanning the light for forming the image and projecting the light onto a screen, a photodetector for detecting light reflected on the screen, and correction means for correcting an image by controlling the projected light on the basis of the result of detection performed by the photodetector.

According to still another aspect of the present invention, there is provided an image correction method comprising: scanning light for forming an image by an optical deflector and projecting the light onto a screen, detecting light reflected on the screen by using a photodetector, and correcting the image by controlling the projected light on the basis of the result of detection using the photodetector.

According to a further aspect of the present invention, there is provided an image correction method comprising mixing light for forming an image and measuring light on one optical axis by means of a mixing optical system, scanning the mixed light by an optical deflector and projecting the light onto a screen, and correcting the image by controlling the projected light on the basis of the result of detection using the photodetector.

The above points are the features of the present invention, and details and functions thereof will be described below.

DESCRIPTION OF THE PREFERRED EMBODIMENTS

An image projector in accordance with the present invention comprises a light source for supplying light for forming an image, a measuring light source for supplying measuring light, a mixing optical system for mixing the light for forming an image and the measuring light on one optical axis, an optical deflector provided as projection means for scanning light mixed by the mixing optical system and projecting the light to a screen, and a photodetector for detecting the measuring light reflected on the screen. The measuring beam can be easily made to travel to each of a plurality of measuring points on the screen by scanning the measuring light with the common optical deflector to the light for forming the image.

Figure 1:
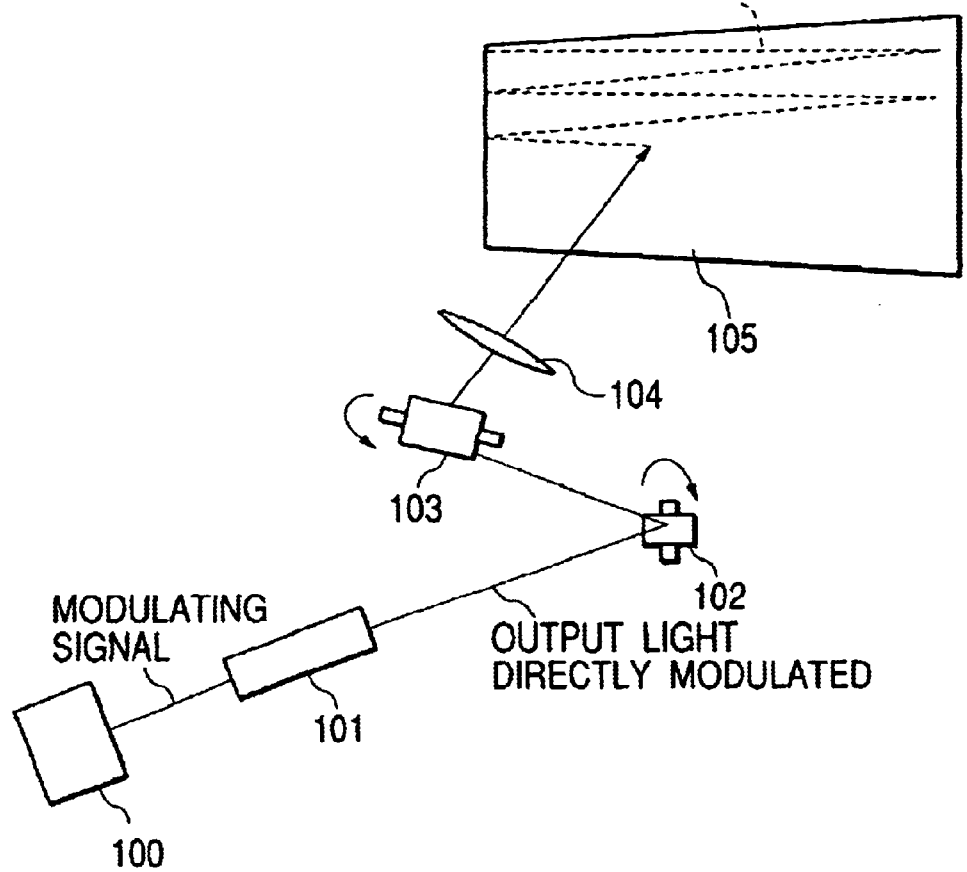
FIG. 1 is a block diagram for explaining a laser display.
Figure 2:
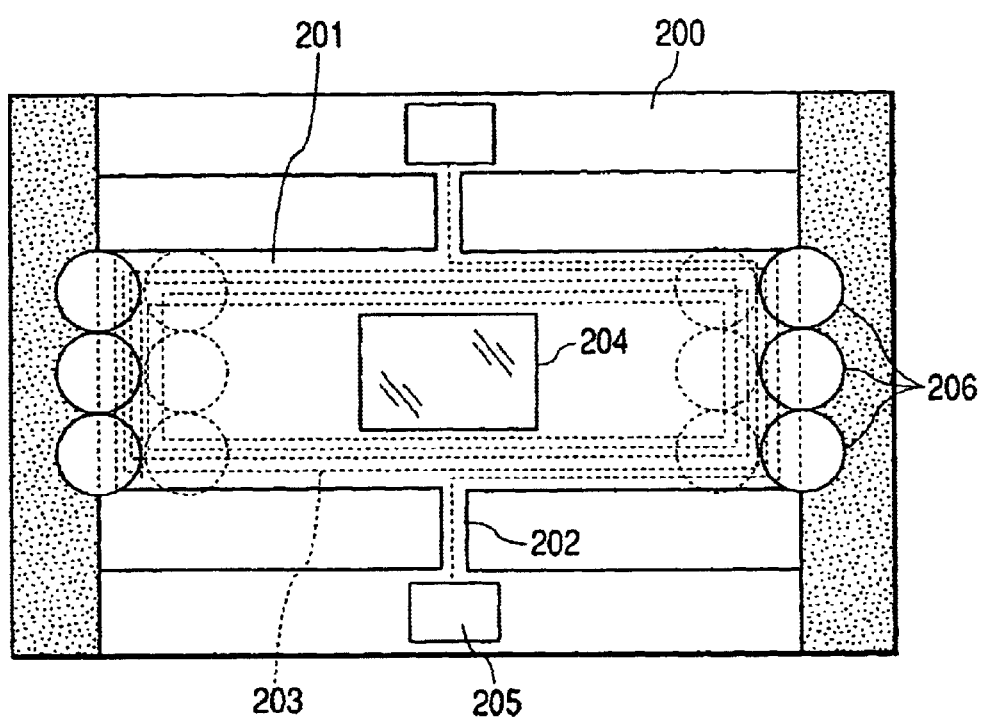
FIG. 2 is a diagram for explaining a micromirror.
Figure 3:
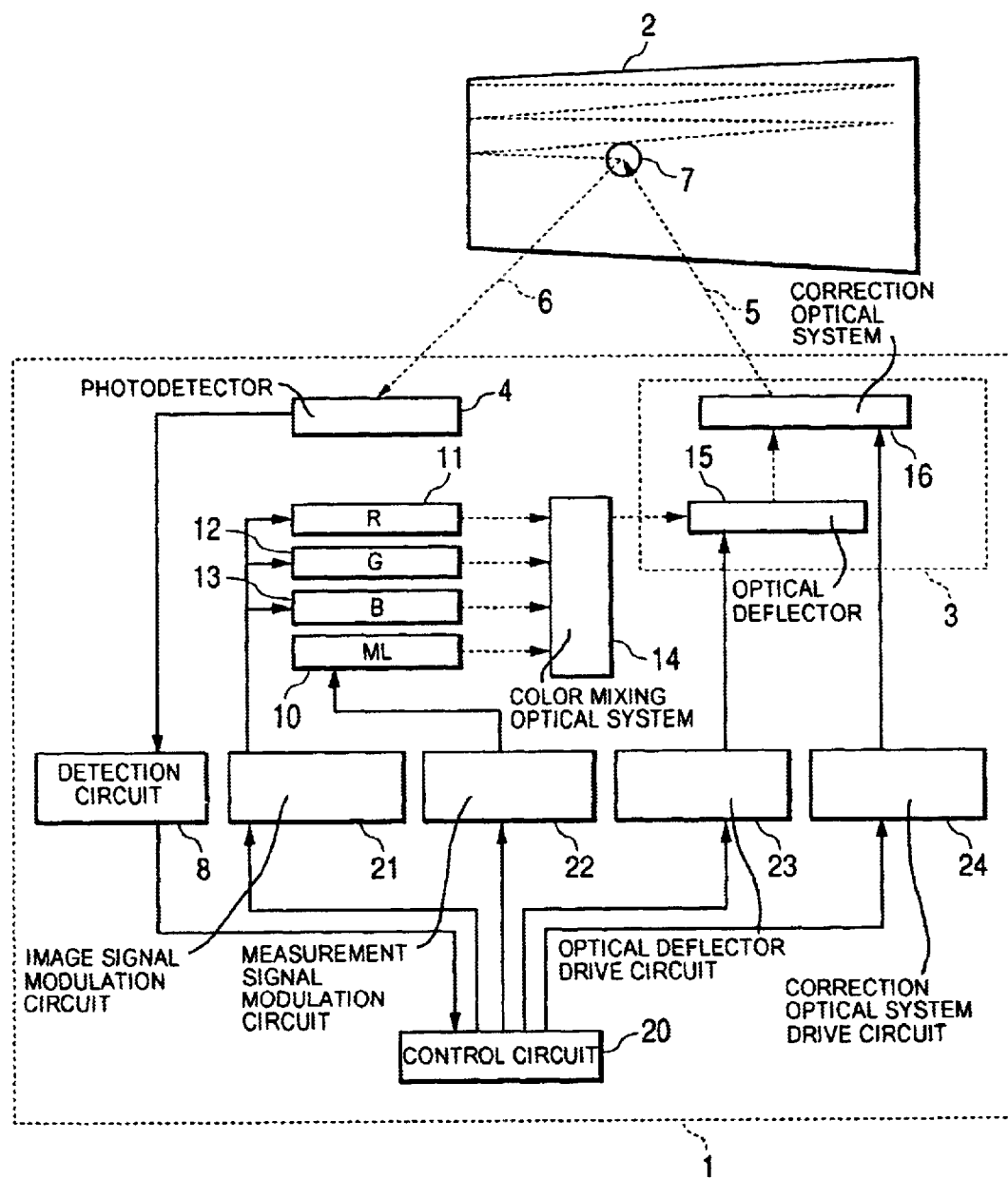
FIG. 3 is a block diagram of an image projector according to the present invention.

FIG. 3 is a block diagram showing a typical example of the image projector in accordance with the present invention. Light beams respectively emitted from a red (R) light source 11 for supplying red light, a green (G) light source 12 for supplying green light, a blue (B) light source 13 for supplying blue light, and a measuring light source 10 for supplying measuring light are converged on one optical axis by a color mixing optical system 14. The converged light beams are deflected by an optical deflector 15 which functions as projection means. The deflected light beams travel through a correction optical system 16 and form an image on a screen 2. The optical deflector 15 and the correction optical system 16 constitute an emergence optical system 3. The R light source 11, the G light source 12 and the B light source 13 for producing image signals operate on the basis of signals from an image signal modulation circuit 21. The measuring light source 10 for distance measurement operates on the basis of a signal from a measurement signal modulation circuit 22. The optical deflector 15 operates on the basis of a signal from an optical deflector drive circuit 23. The correction optical system 16 operates on the basis of a signal from a correction optical system drive circuit 24. A control circuit 20 controls the image signal modulation circuit 21, the measurement signal modulation circuit 22, the optical deflector drive circuit 23, and the correction optical system drive circuit 24 so that these circuits function correctly.

Figure 4:
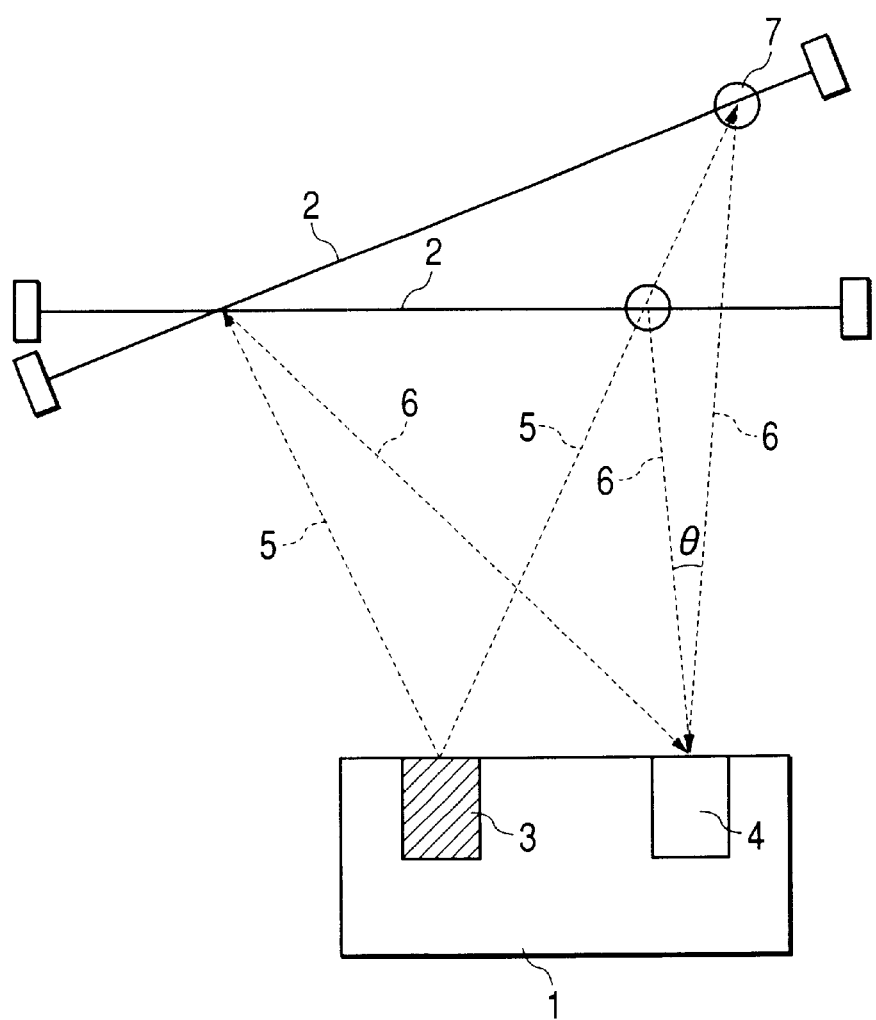
FIG. 4 is a diagram showing a principle of measurement in the image projector according to the present invention.

A part of measuring light components in light 6 reflected on the screen 2 is measured by the photodetector 4. It is desirable that the photodetector 4 has an area sensor capable of detecting an incident angle of measuring light. While the deflection angle at which emergent light 5 from emergence optical system 3 is emergent is constant, emergent light 5 has an angular difference θ when reaching the photodetector 4 if a measuring point 7 on the screen 2 is shifted, as shown in FIG. 4. On the basis of this phenomenon, the positional relationship between the image projector 1 and the screen 2 is detected by using a detection circuit 8. More specifically, the distance between the screen 2 and the image projector 1 and the inclination of the screen 2 with respect to the emergent light 5 from the image projector 1 can be detected corresponding to the deflection angle of the optical deflector 15. According to the present invention, the photodetector 4 may detect only measuring beam at particular incident angles. In such a case, the deflection angle of the optical deflector 15 when measuring light is detected is detected by using the detection circuit 8.

Information obtained by the detection circuit 8 is fed back to the control circuit 20. The control circuit 20 controls the signals to the image signal modulation circuit 21, the optical deflector drive circuit 23, the correction optical system drive circuit 24, and other components on the basis of this information to correct the shape and the size of the displayed image area. In this manner, an image can be provided in a correct shape and in a correct size. Feedback control for image correction in accordance with the present invention can be performed at any time. The control circuit 20, the image signal modulation circuit 21, the optical deflector drive circuit 23 and the correction optical system drive circuit 24 constitute correction means.

The image projector in accordance with the present invention projects the above-described measuring light to a plurality of points on the screen at different times by scanning the measuring light by using the optical deflector, and detects with the photodetector the measuring light reflected on the screen at each of the different times. The measuring light is, preferably, nonvisible light such as infrared or ultraviolet not seen in the image area. However, visible light may also be used. The measuring light may be continuously emitted or may be emitted only at particular points during scanning of the light by the deflector. Also, measuring light may be emitted in a certain emission pattern. It is preferred that the wavelengths of the light sources for forming an image are those of three primary colors of light in which a multicolor image can be displayed. However, the light sources may have any of a wavelength for monochromatic display, wavelengths for two-color display, and wavelengths for display in three or more colors.

In the image projector of the present invention, the scanning angle of the optical deflector, the correction optical system, etc., can be controlled according to detection results to adjust the image area size and shape and the focus of the light beams. It is also possible to detect the distance to the screen with respect to the mirror angle of the optical deflector.

The image projector of the present invention having image area automatic adjustment functions is designed so as to supply measuring light through the optical system for emergent light for image display and can therefore be simplified in configuration and reduced in size. Since scanning with measuring light is performed by using the deflector, measurements at a plurality of measurement points can easily be realized by using one measuring light source. Moreover, two or more photodetectors may be provided to easily measure the absolute value of the deflection angle of the deflector without using any complicated sensor.

The components of the present invention have been described. Details and functions of the components of the present invention will be described below.

The present invention will be described in detail with respect to examples thereof with reference to the accompanying drawings.

EXAMPLE 1

The present example represents a first embodiment of the image projector in accordance with the present invention.

Figure 5:
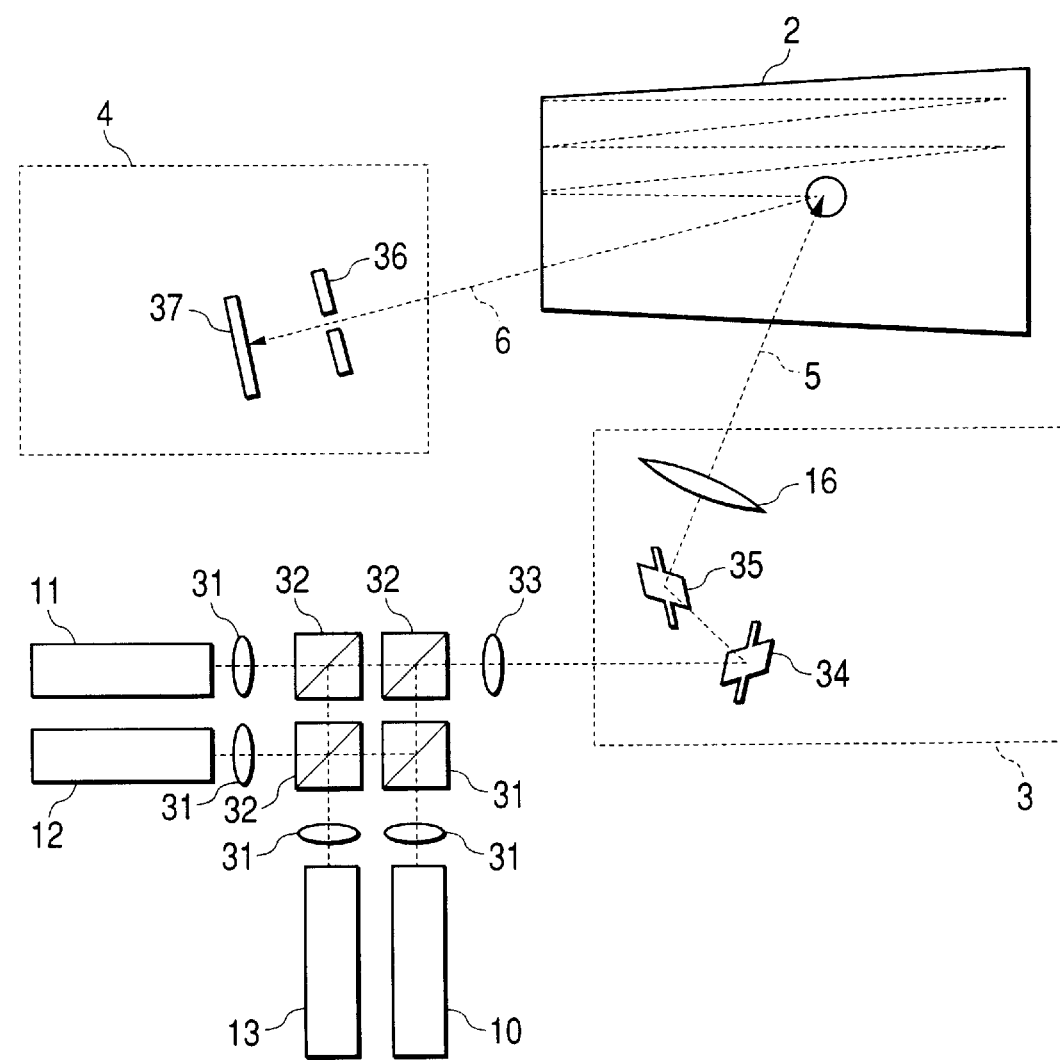
FIG. 5 is a diagram showing a configuration of the image projector of Example 1.

This example of the present invention employs the same image projector as that shown by the block diagram of FIG. 3. FIG. 5 is a diagram showing a concrete structure of an arrangement in accordance with this example.

Light beams respectively emitted from a red (R) light source 11 having modulation means and supplying red laser light having a wavelength of 630 nm, a green (G) light source 12 having modulation means and supplying green laser light having a wavelength of 520 nm, a blue (B) light source 13 having modulation means and supplying blue laser light having a wavelength of 450 nm, and a measuring beam source 10 having modulation means and supplying infrared laser light having a wavelength of 850 nm are converged on one optical axis by a color mixing optical system 14 formed by four collimator lenses 31, dichroic mirrors 32, and a condenser lens 33.

The converged light beams are deflected by an X-axis optical deflector 34 and a Y-axis optical deflector 35. The deflected light beams travel through a correction optical system 16 and form an image on screen 2. The X-axis optical deflector 34, the Y-axis optical deflector 35 and the correction optical system 16 constitute an emergence optical system 3. Each of the X-axis optical deflector 34 and the Y-axis optical deflector 35 has a mirror supported on torsion bars and can deflect light striking the mirror by rotational vibration of the mirror about an axis of the torsion bars.

A part of a measuring light component in light 6 reflected on the screen 2 passes through a pinhole 36 to be measured on an infrared sensor 37 which is an area sensor, and whereby it becomes possible to detect an incident direction. The pinhole used in this example may be replaced with a slit, a lens, a concave mirror, or a combination thereof.

Figure 6:
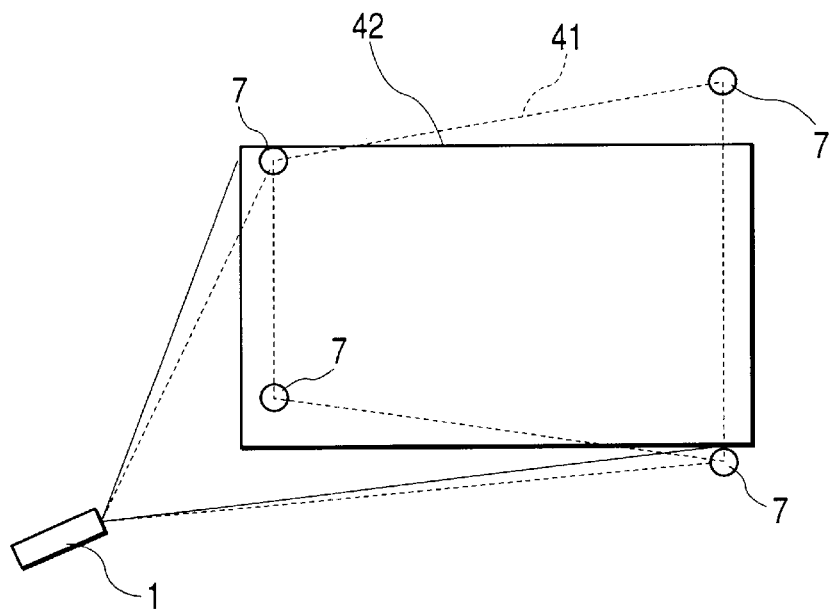
FIG. 6 is a diagram for explaining image correction using the image projector of Example 1.

FIG. 6 shows an example of image area correction using the image projector in this example of the present invention. The screen 2 is irradiated with a certain scanning beam from the image projector 1 by using the X-axis optical deflector 34 and the Y-axis optical deflector 35, whereby an image area 41 before correction is formed. Four measuring points 7 corresponding to the four corners of the image area are irradiated with infrared light at different times. Reflected light 6 reflected on the screen at each of these times is measured with the photodetector 4. The positional relationship between the measuring points 7 and the image projector 1 is detected by using the detection circuit 8 shown in FIG. 3, and a correction signal is sent from the control circuit 20 to the image signal modulation circuit 21. The image signals are thereby corrected and an image area 42 after correction is formed.

Although an infrared beam is used as a measuring light in this example, an ultraviolet or visible light beam may alternately be used if it has such a wavelength as to be discriminable from the image-forming visible light.

In the image projector of this example, the scanning with the measuring light can be performed by using the common optical deflectors which also deflects the visible light beams and, therefore, measurements at a plurality of measurement points can easily be realized by using one measuring light source. Also, the image projector can be simplified in construction and reduced in size since the measuring light is similarly supplied through the optical system for emergent light for image display.

EXAMPLE 2

The example represents a second embodiment of the image projector in accordance with the present invention. The arrangement in accordance with this embodiment is substantially the same as that in Example 1 shown in FIG. 5, but it is characterized by mounting photodetectors at two different positions. In this example, measurements are made at nine measurement points 7 on the screen.

Figure 7:
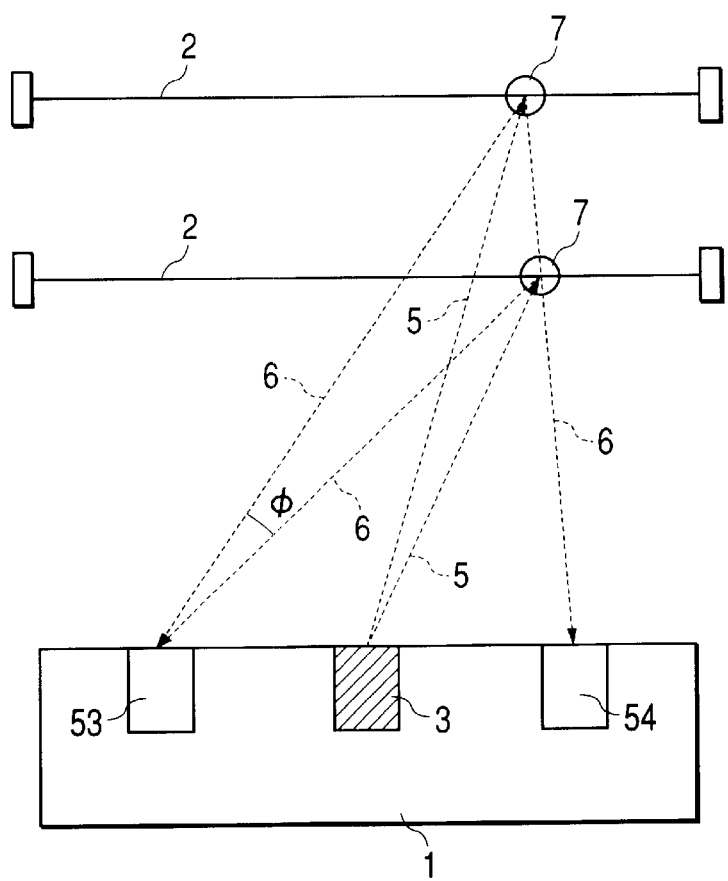
FIG. 7 is a diagram showing a principle of measurement the image projector of Example 2.

FIG. 7 shows the principle of measurement in this example. The image projector 1 in accordance with this example has an emergence optical system 3, a first photodetector 53 and a second photodetector 54, where emergent light 5 emitted from the emergence optical system 3 is reflected on the screen 2. In this example, even when the incident angle on the second photodetector 54 of reflected light 6 reflected on the screen 2 is constant, reflected light 6 has an angular difference φ at the first photodetector 53 if the position of the screen is changed. Therefore it is possible to simultaneously determine the position of the screen 2 and the deflection angle of the optical deflector with respect to the measurement point 7.

Figure 8:
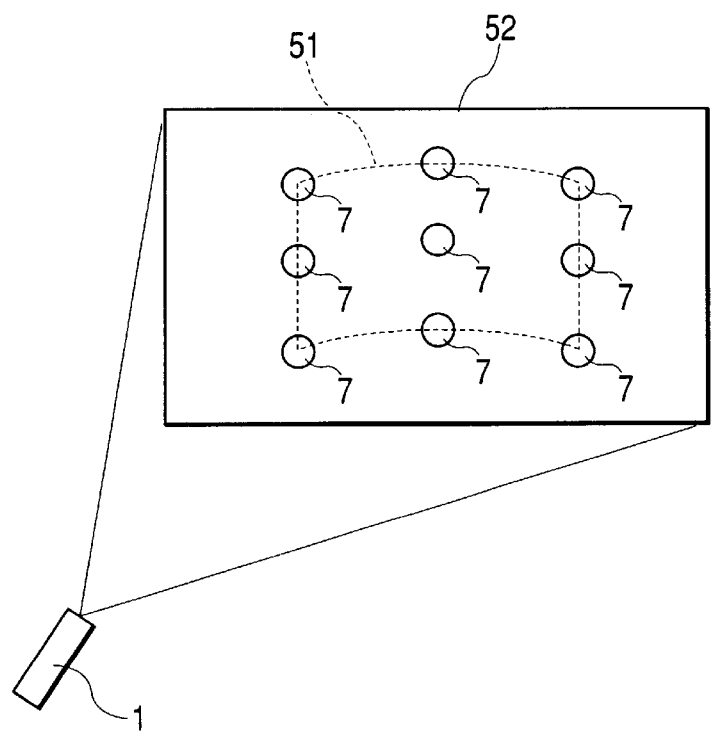
FIG. 8 is a diagram for explaining image correction using the image projector of Example 2.

FIG. 8 shows an example of image area correction using the image projector in this example. The screen 2 is irradiated with a certain scanning beam from the image projector 1 by using the optical deflectors, whereby an image area 51 before correction is formed. Nine measuring points 7 in the image area are irradiated with infrared light at different times. Reflected light 6 reflected on the screen at each of these times is measured by using the first photodetector 53 and the second photodetector 54. A positional relationship between the measuring points 7 and the image projector 1 is detected by using the detection circuit 8 shown in FIG. 3, and correction signals are sent from the control circuit 20 to the image signal modulation circuit 21, the optical deflector drive circuit 23, and the correction optical system drive circuit 24. The image signals are thereby corrected to change the scanning ranges of the X-axis optical deflector 34 and the Y-axis optical deflector 35 and to displace the correction optical system 16, thereby forming an image area 52 after correction. Thus, an image can be displayed while being corrected corresponding to a curvature of the screen and the distance between the image projector and the screen.

In this example of the present invention, two photodetectors are provided to easily measure the absolute value of the deflection angle of the deflectors without using a complicated sensor. The image area can be displayed in a suitable size corresponding to the deflection angle of the optical deflectors and the distance between the screen and the image projector. Also, the number of measurement points is increased to enable correction of the image area with respect to a distortion of the screen. Further, these kinds of correction can be performed at any time to always obtain correct images even in a situation where the positional relationship between the image projector 1 and the screen 2 is changed.

EXAMPLE 3

Figure 9:
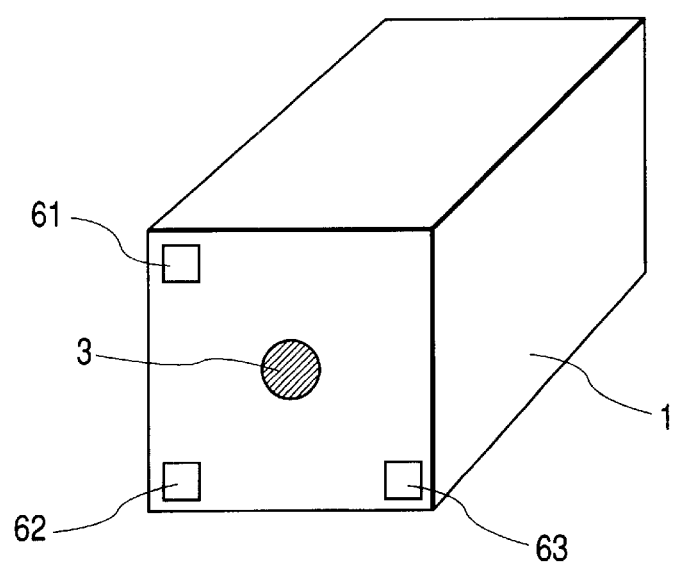
FIG. 9 is a diagram showing the image projector of Example 3.

This example represents a third embodiment of the image projector in accordance with the present invention. The arrangement in accordance with this example is substantially the same as that in Example 1 shown in FIG. 5. As shown in FIG. 9, the image projector 1 includes an emergence optical system 3, a first photodetector 61, a second photodetector 62, and a third photodetector 63. The image projector 1 of this example is also arranged to perform two-dimensional scanning by using the X-axis optical deflector 34 and the Y-axis optical deflector 35, similarly as in Example 1 shown in FIG. 5.

Figure 10:
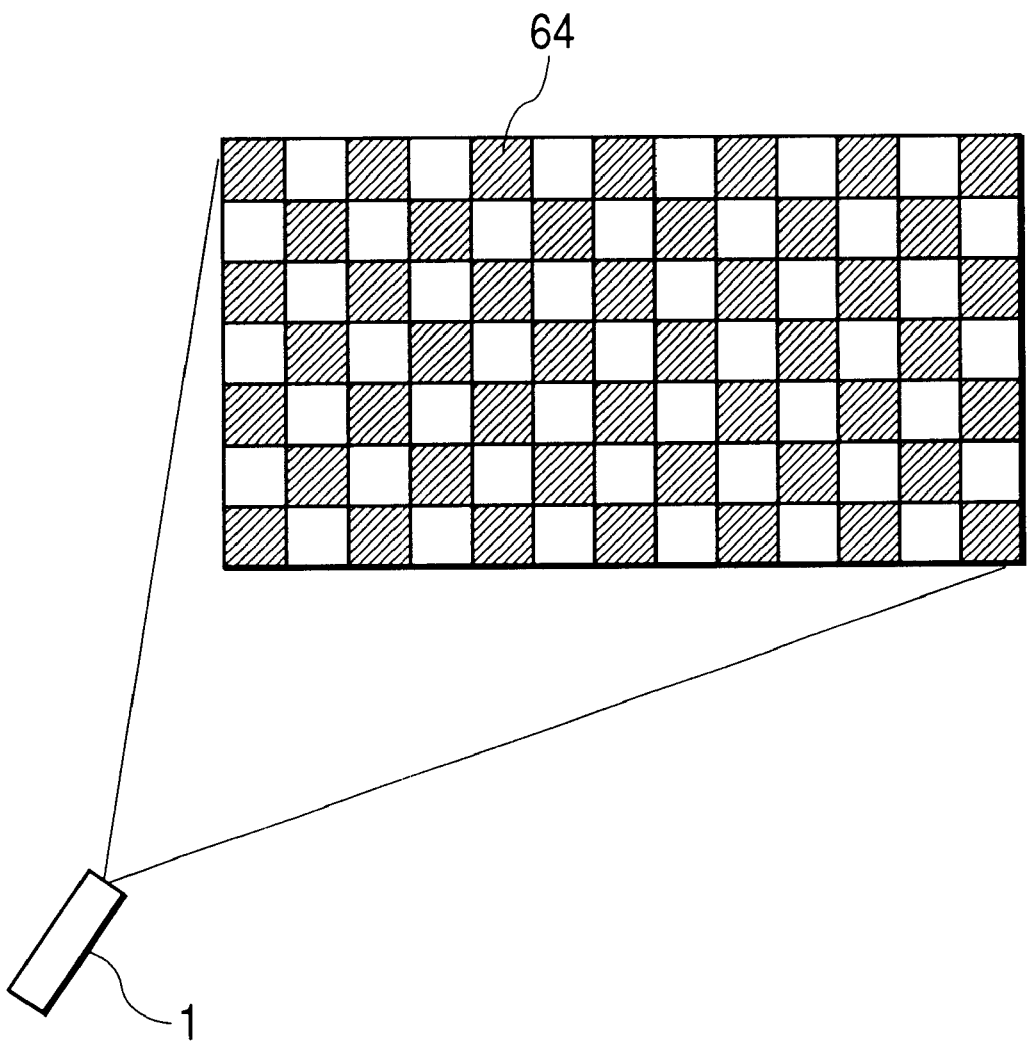
FIG. 10 is a diagram showing a measuring light pattern in Example 3.

The principle of measurement in this example is the same as that shown in FIG. 4 or 7. In this example, however, a measuring light pattern 64 such as shown in FIG. 10 is formed on the screen and is measured with the three photodetectors 61, 62 and 63. This arrangement enables information about a condition along the X-axis direction of scanning (horizontal scanning direction) and information about a condition along the Y-axis direction (vertical scanning direction) to be independently obtained with accuracy. Measurement light used in this example is infrared light. Only an image projected onto the screen is recognized with the human eyes, while only infrared light reflected on the screen is detected by the three photodetectors 61, 62 and 63.

The configuration of the measuring pattern 64 is selected according to one's need. In this example, the scanning light beams may be turned on and off in a certain cycle and the reflected light obtained from scanning light turned on and off may be measured, whereby it is possible to grasp details of the scanning characteristics of the deflectors.

The arrangement in this example ensures that image correction for projecting a correct image with respect to the inclination of the screen and the distance between the screen and the image projector can be performed with improved accuracy in comparison with that in Example 1 or Example 2, and that the scanning characteristics of the X-axis optical deflector 34 and the Y-axis optical deflector 35 can be independently detected with improved accuracy.

According to the present invention, as described above, an image projector can be provided which has the function of automatically adjusting the size of the image area and the focal distance corresponding to the distance between the screen and the image projector, and the function of automatically correcting the shape of the image area corresponding to an inclination or a curvature of the screen, and which is simpler in structure, reduced in size and in weight, and improved in portability.

According to the present invention, scanning with measuring light is performed by using projection means such as common optical deflectors which are also used for light for forming an image and, therefore, measurements at a plurality of measurement points can easily be realized by using one measuring light source. The image projector can be simplified in construction and reduced in size since measuring light is supplied through the optical system for emergent light for image display. The image area can be displayed in a suitable size corresponding to the deflection angle of the optical deflector (projection means) and the distance between the screen and the image projector. The number of measurement points is increased to enable correction of the image area with respect to a distortion of the screen. Image correction can be performed at any time to always obtain correct images even in a situation where the positional relationship between the image projector and the screen is changed.

A plurality of photodetectors are provided to enable image correction with higher accuracy. Also, the absolute value of the deflection angle of the projection means, e.g., optical deflectors can be easily measured without using any complicated sensor. Further, the scanning characteristics of the plurality of optical deflectors can be independently measured with high accuracy.

What is claimed is:

1. An image projector comprising:
    a light source having a modulator for modulating light for forming an image;
    a measuring light source for supplying measuring light;
    a mixing optical system for mixing the light for forming an image and the measuring light on one optical axis;
    an optical deflector for scanning the light mixed by said mixing optical system and projecting the mixed light onto a screen to form an image;
    a photodetector for detecting the measuring light reflected on the screen; and
    a correction system for correcting the image by controlling the projected light on the basis of a result of detection performed by the photodetector.

2. The image projector according to claim 1, further comprising a plurality of said photodetectors for detecting the measuring light reflected on the screen.

3. The image projector according to claim 1, further comprising a detection circuit for detecting an angle of incidence of the measuring light on said photodetector.

4. The image projector according to claim 1, further comprising a measurement signal modulation circuit for modulating the measuring light.

5. The image projector according to claim 1, wherein the measuring light is nonvisible light.

6. The image projector according to claim 5, wherein the nonvisible light is infrared light.

7. The image projector according to claim 1, wherein said light source having a modulator for modulating light for forming an image comprises a plurality of light sources for supplying lights with different wavelengths.

8. The image projector according to claim 7, wherein said plurality of light sources are three light sources corresponding to three primary colors of light.

9. The image projector according to claim 1, wherein said optical deflector has a mirror supported on a torsion bar.

10. An image correction method comprising the steps of:
    mixing light for forming an image and measuring light on one optical axis of using a mixing optical system;
    scanning the mixed light by an optical deflector and projecting the light onto a screen to form an image; and
    detecting light reflected by the screen by using a photodetector; and
    correcting the image by controlling the projected light on the basis of a result of detection using the photodetector in said detection step.

11. The image correction method according to claim 10, wherein the measuring light is modulated by a measurement signal modulation circuit.

12. The image correction method according to claim 11, wherein the measurement signal modulation circuit performs modulation so that a certain pattern is depicted on the screen with the measuring beam.

13. The image correction method according to claim 10, wherein the measuring light is projected to a plurality of points on the screen at different times and the measuring light reflected on the screen at each of the different times is detected by the photodetector.

14. The image correction method according to claim 10, wherein the measuring light is nonvisible light.

15. The image correction method according to claim 14, wherein the nonvisible light is infrared light.

16. The image correction method according to claim 10, wherein an image projector includes the optical deflector and the photodetector or the mixing optical system, the optical deflector and the photodetector, and the positional relationship between the image projector and the screen is detected by using the photodetector.

17. The image correction method according to claim 10, wherein the deflection angle of the optical deflector is detected by using the photodetector.

18. The image correction method according to claim 10, wherein a shape of the screen is detected by using the photodetector.

19. The image correction method according to claim 10, wherein the image is corrected by modulating the light for forming the image on the basis of a result of detection using the photodetector.

20. The image correction method according to claim 10, wherein the image is corrected by driving a correction optical system on the basis of the result of detection using the photodetector.

21. The image correction method according to claim 10, wherein the image is corrected by controlling the operation of the optical deflector on the basis of the result of detection using the photodetector.

* * * * *

UNITED STATES PATENT AND TRADEMARK OFFICE
CERTIFICATE OF CORRECTION

PATENT NO. : 6,670,603 B2
DATED : December 30, 2003
INVENTOR(S) : Yasuhiro Shimada et al.

It is certified that error appears in the above-identified patent and that said Letters Patent is hereby corrected as shown below:

Column 3,
Line 3, "measurement" should read -- measurement of --; and
Line 57, "has" should read -- have --.

Column 4,
Line 6, "is detected" (second occurrence), should be deleted; and
Line 34, "are" should read -- be --.

Column 5,
Line 55, "deflects" should read -- deflect --.

Column 6,
Line 48, "tion" should read -- tions --.

Column 8,
Line 7, "said" should be deleted;
Line 29, "of" should be deleted; and
Line 31, "and" should be deleted.

Signed and Sealed this

Third Day of August, 2004

JON W. DUDAS
*Acting Director of the United States Patent and Trademark Office*